(12) United States Patent
Davis et al.

(10) Patent No.: US 7,445,647 B1
(45) Date of Patent: Nov. 4, 2008

(54) METHOD FOR MAKING A SINGLE UNIT FUEL CELL

(75) Inventors: Edward Lee Davis, Tigard, OR (US); Benjamin Franklin Schafer, Cornelius, OR (US)

(73) Assignee: Hydra Fuel Cell Corporation, Beaverton, OH (US)

( * ) Notice: Subject to any disclaimer, the term of this patent is extended or adjusted under 35 U.S.C. 154(b) by 269 days.

(21) Appl. No.: 11/437,225

(22) Filed: May 19, 2006

Related U.S. Application Data

(60) Provisional application No. 60/756,442, filed on Jan. 4, 2006, provisional application No. 60/715,697, filed on Sep. 8, 2005, provisional application No. 60/705,600, filed on Aug. 3, 2005.

(51) Int. Cl.
*H01R 43/00* (2006.01)
*H05K 13/00* (2006.01)

(52) U.S. Cl. .............. 29/623.2; 29/623.1; 29/623.4; 29/846; 29/874; 29/876; 422/191; 422/194; 422/195; 422/200; 422/202; 422/203; 422/211; 422/236; 423/650; 423/651; 423/652; 423/653; 423/654; 429/13; 429/22; 429/23; 429/30; 429/34; 429/38; 429/42; 429/44

(58) Field of Classification Search .............. 29/854, 29/623.1–623.5, 825, 846, 874, 876; 429/13, 429/22, 23, 30, 34, 38, 42, 44; 423/650–654; 422/191, 194, 195, 200, 202, 203, 211, 236
See application file for complete search history.

(56) References Cited

U.S. PATENT DOCUMENTS

| | | |
|---|---|---|
| 3,432,356 A | 3/1969 | Christianson |
| 3,553,023 A | 1/1971 | Doyle |
| 4,098,959 A | 7/1978 | Fanciullo |
| 4,243,731 A | 1/1981 | Cheron |
| 4,310,605 A | 1/1982 | Early et al. |
| 4,741,978 A | 5/1988 | Takabayashi |
| 5,334,463 A | 8/1994 | Tajimia et al. |
| 5,366,821 A | 11/1994 | Merrit et al. |

(Continued)

FOREIGN PATENT DOCUMENTS

JP    59067736    10/1985

(Continued)

*Primary Examiner*—Peter DungBa Vo
*Assistant Examiner*—Thiem Phan
(74) *Attorney, Agent, or Firm*—Buskop Law Group, PC; Wendy Buskop

(57) ABSTRACT

A method for making fuel cells is disclosed and includes placing catalyst strips on an anode side and a cathode side of a proton exchange membrane disposed between carbon bases. The method includes metalizing at least two collectors, and drilling a plurality of paths through the body portions to form a first and second metalized collectors, which are placed on opposite sides of the proton exchange membrane to form a membrane electrode assembly. The metalized collectors are connected to form an electrical circuit for operating the fuel cell. A flexible fuel plenum and a flexible oxidant plenum are disposed on opposite sides of the membrane electrode assembly, and a fuel manifold and an oxidant manifold of a sealable two-part housing engage the membrane electrode assembly to provide oxidant to the flexible oxidant plenum and fuel to the flexible fuel plenum forming an operational singe unit fuel cell.

15 Claims, 10 Drawing Sheets

U.S. PATENT DOCUMENTS

| | | |
|---|---|---|
| 5,401,589 A | 3/1995 | Palmer |
| 5,462,815 A | 10/1995 | Horiuchi |
| 5,877,600 A | 3/1999 | Sonntag |
| 6,001,499 A | 12/1999 | Grot et al. |
| 6,218,035 B1 * | 4/2001 | Fuglevand et al. ............ 429/30 |
| 6,387,556 B1 | 5/2002 | Fuglevand et al. |
| 6,743,536 B2 | 6/2004 | Fuglevand |
| 6,745,799 B1 | 6/2004 | Fuglevand |
| 6,773,839 B2 | 8/2004 | Fuglevand et al. |
| 6,793,698 B1 * | 9/2004 | Sanger et al. .............. 48/127.9 |
| 6,805,987 B2 | 10/2004 | Bai et al. |
| 6,806,678 B2 | 10/2004 | Holmes |
| 6,811,906 B2 | 11/2004 | Bai et al. |
| 6,828,050 B2 | 12/2004 | Bai et al. |
| 6,858,335 B2 | 2/2005 | Schmidt et al. |
| 6,939,636 B2 | 9/2005 | Fuglevand et al. |
| 6,982,129 B1 | 1/2006 | Bai et al. |
| 2005/0247552 A1 * | 11/2005 | TeGrotenhuis et al. ........ 201/41 |
| 2008/0044693 A1 * | 2/2008 | Benziger et al. .............. 429/13 |

FOREIGN PATENT DOCUMENTS

| | | |
|---|---|---|
| WO | WO 03/058733 A1 | 7/2003 |
| WO | WO 03/063283 A1 | 7/2003 |

* cited by examiner

US 7,445,647 B1

METHOD FOR MAKING A SINGLE UNIT FUEL CELL

CROSS REFERENCE TO RELATED APPLICATIONS

The present application claims priority to co-pending U.S. Provisional Patent Application Ser. No. 60/705,600 filed on Aug. 3, 2005, entitled "Solid State Microelectronic Fuel Cell System", U.S. Provisional Patent Application Ser. No. 60/715,697 filed on Sep. 8, 2005, entitled "Fuel Cell Implementation in Circuit Board", and U.S. Provisional Patent Application Ser. No. 60/756,442 filed on Jan. 4, 2006, entitled "Fuel Cell Implementation in Multi-Layer Circuit Board", all of which are incorporated herein by reference.

FIELD

The present embodiments relate generally to a method for making a single unit fuel cell with a membrane electrode assembly that permits gases to flow in three dimensions for providing increased power.

BACKGROUND

Currently, many fuel cells use a two dimensional, serpentine gas flow on or through the anode and/or the cathode of the fuel cell.

A need exists for a method for making an improved fuel cell that possesses the capabilities of providing a high level of power and a quick ramp-up time for achieving full power.

A need exists for a method for making a single unit fuel cell that can be manufactured using an inexpensive high volume manufacturing process.

The present embodiments meet these needs.

SUMMARY

The present embodiments generally relate to a method for making a single unit fuel cell that includes a membrane electrode assembly (MEA) with a proton exchange membrane (PEM) disposed between carbon bases. In an embodiment, the carbon base can be a porous carbon material, such as a graphite, a woven carbon cloth, or a non-woven carbon felt, that enables gas diffusion within the fuel cell.

The method includes placing between 0.1 milligrams/cm$^2$ and 0.3 milligrams/cm$^2$ of a first catalyst strip on an anode side of a proton exchange membrane and between 0.1 milligrams/cm$^2$ and 0.3 milligrams/cm$^2$ of a second catalyst strip on a cathode side of the proton exchange membrane, in which the proton exchange membrane is disposed between a first carbon base on the anode side and a second carbon base on the cathode side.

The first catalyst strips can be deposited in parallel strips on a side of the first carbon base adjacent to the proton exchange membrane and at an orientation, such as a 45 degree angle orientation, to the second catalyst strips deposited on a side of the second carbon base adjacent to the proton exchange membrane for forming a striped proton exchange membrane.

The steps of the method continue by depositing a gasket around the edge of the striped proton exchange membrane for sealing the sides of the proton exchange membrane without covering the anode side or the cathode side.

Next, the method for making a single unit fuel cell can include metalizing body portions of at least two collectors forming a first metalized collector and a second metalized collector. Each metalized collector can be shaped with a body portion and a projection portion.

Then, a plurality of paths can be drilled through the body portions of the first metalized collector and the second metalized collector, and the striped proton exchange membrane can be placed between the first metalized collector and the second metalized collector.

The steps of the method include disposing the first metalized collector adjacent to the first carbon base on the anode side and in communication with the first carbon base and the proton exchange membrane, and disposing the second metalized collector adjacent to the second carbon base on the cathode side and in communication with the second carbon base and the proton exchange membrane for forming a membrane electrode assembly.

The method continues by disposing a flexible fuel plenum on a side of the membrane electrode assembly and disposing a flexible oxidant plenum on an opposite side of the membrane electrode assembly for forming an intermediate structure. The top central portion and the bottom central portion of the flexible plenums can include a plurality of nibs for increasing turbulence in gases flowing over the top central portion and the bottom central portion of each flexible plenum. The plurality of nibs can increase communication between the first metalized collector and the first carbon base on the anode side and the second metalized collector and the second carbon base on the cathode side of the proton exchange membrane.

Then, the method includes connecting the first metalized collector and the second metalized collector to fuel cell connectors for engaging the projections of the first metalized collector and the projections of the second metalized collector forming an electrical circuit for operating the fuel cell and for providing a power removal circuit for facilitating removal of created power from the fuel cell.

The method for making a single unit fuel cell continues by placing a fuel manifold and an oxidant manifold in a two-part housing. The two-part housing provides support and compresses the flexible plenums to the membrane electrode assembly to provide communication between the plurality of nibs and the first metalized collector on the anode side and the plurality of nibs and the second metalized collector on the cathode side for diffusing the fuel gases and oxidant gases.

The two-part housing further includes: a fuel entry port with a fuel channel in communication with the fuel manifold, a fuel exhaust port in communication with the flexible fuel plenum, an oxidant entry port with an oxidant channel in communication with the oxidant manifold, and an oxidant exhaust port in communication with the flexible oxidant plenum. The fuel manifold is secured to the two-part housing to receive fuel from a fuel source through the fuel channel, and the oxidant manifold is secured to the two-part housing to receive oxidant from an oxidant source through the oxidant channel.

The steps of the method continue by placing the intermediate structure between the fuel manifold and the oxidant manifold to connect the fuel manifold to one of the flexible fuel plenums for forming an anode and to connect the oxidant manifold to one of the flexible oxidant plenums for forming a cathode. Next, the method includes engaging the parts of the two-part housing together around the intermediate structure. Then, the method includes providing an oxidant to the flexible oxidant plenum and a fuel to the flexible fuel plenum forming an operational singe unit fuel cell.

The method for making a single unit fuel cell can include securing a temperature sensor, a voltage sensor, a current sensor, a humidity sensor, and combinations thereof, to the projections of at least one metalized collector and further securing a processor to the projections of the at least one metalized collector in communication with the sensors. Then, the processor, which includes a memory with computer instructions and a database storage, can monitor and regulate a temperature, a voltage, a current, humidity, a gas flow, or combinations thereof, based on preset limits, by using computer instructions to instruct the processor for monitoring and regulating. The preset limits are stored in the database storage of the processor.

BRIEF DESCRIPTION OF THE DRAWINGS

The detailed description will be better understood in conjunction with the accompanying drawings as follows.

Figure 1A:
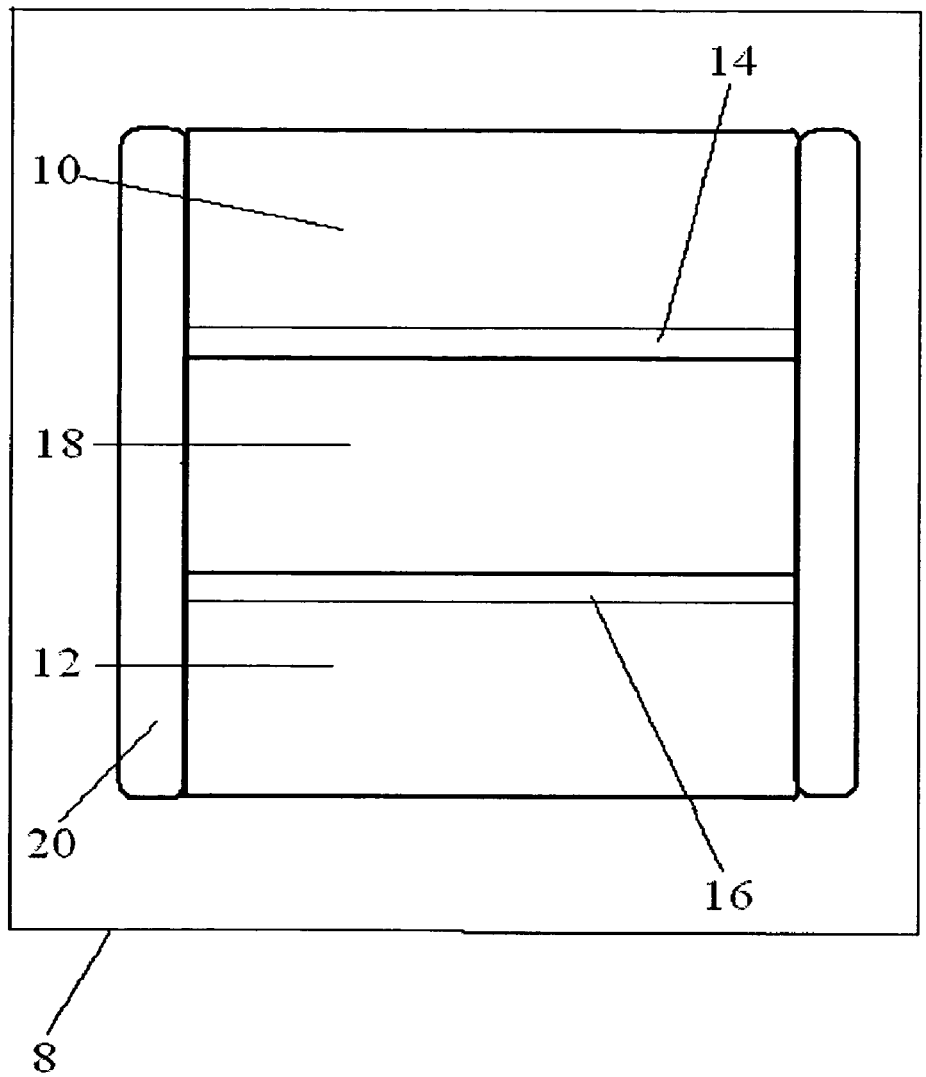
FIG. 1a depicts a cross sectional view of a membrane electrode assembly (MEA) for use in an embodiment of a method for making a single unit fuel cell.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Various embodiments of the present invention are based on various geometries. Some embodiments comprise an integrated micro-electromechanical circuit board, that is integrated into modularly replaceable fuel cells that can be of different voltages, and that can be plugged or unplugged from the system while the system is operating. An embodiment further contemplates that an indicator light can be used to indicate whether a fuel cell is operating normally or malfunctioning.

Some fuel cell designs and implementations reveal a mechanical system approach, with emphasis on framework supporting a macro level implementation of the catalytic fuel reaction surface coupled with a large membrane for proton/electron separation. The surface area of the catalyst and the surface area of the proton exchange membrane (PEM) are two gross parameters that are roughly controlled to provide the base parameters for the functioning of the fuel cell. In addition, fuel flow rate, reaction gas flow rate, cell temperature, and electrical load are all parameters controlled to utilize the fuel cell.

In this invention, the flow of electrons in an external circuit mirrors the flow of protons across the proton exchange membrane (PEM) to produce proton/electron pair recombination with oxygen to make water.

Some embodiments of the fuel cell provide hydrogen ions (H+) to produce proton flow across a proton permeable, electrically insulating, perfluorosulphonic acid based hydrophilic membrane.

The present embodiments relate generally to a single unit fuel cell that permits gases to flow in three dimensions, rather than in 2 dimensions through the fuel cell. A fuel cell with a linear two-dimensional flow of gases over a limited surface area of the membrane electrode assembly can be very slow and inefficient in producing power. The present embodiments include a fuel cell that permits gases to flow through the paths in a metalized collector, and to flood a membrane electrode assembly (MEA) enabling approximately 99% of the proton exchange membrane of the membrane electrode assembly (MEA) to be used, rather than just going across the membrane electrode assembly (MEA). The embodiments of the fuel cell allow in excess of 50% of the gas diffusion to be utilized. This flow of gases in three dimensions and using 99% of the proton exchange membrane of the membrane electrode assembly allows for a greater amount of power (Amps) to be produced per square inch of proton exchange membrane (PEM) and permits a quick ramp-up time to achieve full power.

Another benefit of the single unit fuel cell is the ability to produce single unit fuel cells at an inexpensive cost because of the efficient use of the membrane electrode assembly and the ability to manufacture metalized collectors using an inexpensive high volume metalizing technique and a fast and efficient laser drilling to create the paths in the collectors.

The present embodiments generally relate to a method for making a single unit fuel cell that includes a membrane electrode assembly (MEA) with a proton exchange membrane (PEM) disposed between a first carbon base and a second carbon base. In an embodiment, the carbon base can be a porous carbon material, such as a graphite, a woven carbon cloth, or a non-woven carbon felt, that enables gas diffusion within the fuel cell.

The steps of the method include placing between 0.1 milligrams/$cm^2$ and 0.3 milligrams/$cm^2$ of a first catalyst strip on an anode side of a proton exchange membrane and between 0.1 milligrams/$cm^2$ and 0.3 milligrams/$cm^2$ of a second catalyst strip on a cathode side of the proton exchange membrane, in which the proton exchange membrane is disposed between a first carbon base on the anode side and a second carbon base on the cathode side.

The first catalyst strips can be deposited in parallel strips on a side of the first carbon base adjacent to the proton exchange membrane and at an orientation, such as at a 45 degree angle, to the second catalyst strips deposited on a side of the second carbon base adjacent to the proton exchange membrane for forming a striped proton exchange membrane. Each catalyst, or electrocatalyst, can be made of a platinum catalyst, a ruthenium catalyst, and combinations thereof. For example, a proton exchange membrane can have an anode side with 0.3 milligrams/$cm^2$ of a platinum and/or platinum/ruthenium mixed catalyst located at the interface of the proton conducting membrane and a cathode side with 0.3 milligrams/$cm^2$ of a platinum catalyst located at the interface of the proton conducting membrane.

The depositing of the first catalyst strips and the second catalyst strips can be performed by sputtering, printing, or silk screening. Benefits of the catalyst strips include an ability to control electrical conductivity, to control location of reaction sites within the fuel cell, and to control heat flow/thermodynamic characteristics of the fuel cell. The catalyst strips can vary in width or can be the same width. The catalyst strips can vary in length and thickness. For example, a catalyst strip can be up to 0.01 inch in thickness. The catalyst strips can be grouped to each other, or the catalyst strips can be an equal distance apart or varying distances apart from each other. In an embodiment, the first catalyst strips and the second catalyst strips can be the same catalyst strips.

The embodiments of the fuel cell include a proton exchange membrane. The, proton exchange membrane can include: from 8% up to about 11% by weight of a perfluorosulfonic acid resin, from 2% up to about 3% by weight of a silicotungstic acid, from 12% up to about 15% by weight of a de-ionized water, and the remainder percentage of the proton exchange membrane can be an isopropyl alcohol, such as up to about 75% by weight of isopropyl alcohol.

Examples of a proton exchange membrane can be NAFION® made by DuPont™, or other proton exchange membranes (PEM) made by Hoku Scientific, Incorporated of Honolulu, Hi. or 3M of St. Paul Minn. Other usable proton exchange membranes include the proton exchange membranes made by BCS Technologies, Incorporated.

The method continues by depositing a gasket around the edge of the striped proton exchange membrane for sealing the sides of the proton exchange membrane without covering the anode side or the cathode side. Securing the gasket to the edge of the striped proton exchange membrane can be performed by using a silicon sealant.

The gasket can be between 3 millimeters and 5 millimeters in width. The gasket can be flexible, optionally adhesive, water resistant, gas resistant, and able to withstand extremes in temperature without becoming brittle or cracking. The gasket can be about 0.017 inches or about 0.432 millimeters (mm) in thickness. As an example, the gasket can be made from a polytetrafluoroethylene (PTFE) copolymer or a similar durable material, such as double stick PTFE tape, and can be 3 millimeters in width and 0.432 millimeters in thickness. The polytetrafluoroethylene can be made by DuPont of Wilmington or 3M of Minnesota.

Next, the method for making a single unit fuel cell can include metalizing body portions of at least two collectors to form a first metalized collector and a second metalized collector. Each metalized collector can be shaped with a body portion and a projection portion.

Then, a plurality of paths can be drilled through the body portions of the first metalized collector and the second metalized collector, and the striped proton exchange membrane can be placed between the first metalized collector and the second metalized collector.

The steps of the method continue by disposing the first metalized collector adjacent to the first carbon base on the anode side and in communication with the first carbon base and the proton exchange membrane, and disposing the second metalized collector adjacent to the second carbon base on the cathode side and in communication with the second carbon base and the proton exchange membrane for forming a membrane electrode assembly (MEA).

The method includes covering between 40% and 60% of the metalized collector with a plurality of paths, and each path can vary in diameter, such as a diameter between 0.1 inch and 0.5 inches. The drilling of the paths in the metalized collector can be formed by laser drilling or mechanically drilling. The shape of the drilled paths can include: round, square, trapezoidal, other shapes, and combinations thereof.

The method includes creating a "flood plane" for the gases using the paths in the metalized collector. Creating a flood plane for the gases permits free flow of the gases while maintaining structural strength. In an embodiment for a metalized collector that is 6 inches in length by 6 inches in width by 4 inches in thickness, there can be over 5,000 paths drilled into the metalized collector.

Each metalized collector can have one layer of metal coating which can be between 1 micro-inch and 2 micro-inches of an inert metal capable of resistance to degradation in the presence of strong acids. The one layer on the metalized collector can be made of: a gold, a gold alloy, and combinations thereof, that are deposited on at least a portion of the metalized collector.

The steps of the method include securing a temperature sensor, a voltage sensor, a current sensor, a humidity sensor, and combinations thereof, to the projections of at least one metalized collector for monitoring and regulating temperature, voltage, current, humidity, and gas flow. An example of a temperature sensor can be a thermocouple or a thermistor, such as those provided by Omega of the United States. An example of a current sensor can be a Hall Effect sensor.

The steps of the method further include securing a processor to the projections of at least one metalized collector in connection with the sensors, such that the processor can monitor and regulate temperature, voltage, current, humidity, gas flow, pressure or combinations thereof, within or based on preset limits that are stored in the database storage of the processor. The processor includes a memory with computer instructions and a database storage. The computer instructions located in the memory can instruct the processor for monitoring and regulating temperature, voltage, current, humidity, gas flow, pressure or combinations thereof, within the preset limits.

A Motorola chip can be used as a microprocessor. As an example of regulating temperature based on preset limits, computer instructions can be used to instruct the processor to communicate with the temperature sensor for obtaining temperature data and comparing the obtained temperature data readings with preset limits for temperature to properly regulate the temperature of the fuel cell. In one embodiment, the sensors and processor can be soldered onto a metalized collector.

The steps of the method include securing a pressure sensor to the body portion of at least one metalized collector and connecting the pressure sensor to the processor located on the projection of the at least one metalized collector. An Omega pressure transducer can be an example of a pressure sensor usable with the microprocessor defined herein. In another embodiment, etching or masking techniques can be used for embedding additional sensors in the metalized collector.

The method for making a single unit fuel cell includes generating power for starting up the single unit fuel cell by using a power supply in communication with the processor. An example of a power supply can be a 12 volt power supply made by Royal Philips Electronics or Siemens for supplying start-up power to the processor.

The steps of the method continue by disposing a flexible fuel plenum on a side of the membrane electrode assembly and disposing a flexible oxidant plenum on an opposite side of the membrane electrode assembly for forming an intermediate structure. An example of a flexible plenum can be a substantially non-porous, one-piece, bilaterally symmetrical material. The flexible plenums can have a thickness of between 0.062 inches and 0.125 inches.

The method includes transmitting a gas to at least one metalized collector using a flexible plenum, that includes a top central portion and a bottom central portion. Each central portion of the flexible plenum can include a plurality of holes for transmitting the gases. The method includes increasing turbulence in gases flowing over the top central portion and the bottom central portion of each flexible plenum by using a plurality of nibs located on the top central portion and the bottom central portion. The plurality of nibs can have a diameter with a range between 0.04 inches and 0.075 inches, and a density of between 25 per square inch and 100 per square inch. As an example for a 6 inch in length by a 6 inch in width by a 4 inch in thickness metalized collector, the flexible plenum can have ¼ inch tall nibs and ¹⁄₁₆ inch short nibs. The plurality of nibs can increase communication between the metalized collector and the first carbon base on the anode side and the second metalized collector and the second carbon base on the cathode side of the proton exchange membrane of each fuel cell.

Further, the steps of the method include supplying fuel to the fuel cell by using a gas inlet passageway provided by a frame that surrounds the top central portion and the bottom central portion of each flexible plenum. The frame provides a gas exhaust passageway, and each frame is adapted for forming a seal when engaging another fuel cell.

Then, the method includes connecting the at least two metalized collectors to fuel cell connectors for transferring power outside the membrane electrode assembly. The method includes using connectors to engage the projections of the first metalized collector and the projections of the second metalized collector to form an electrical circuit for operating the fuel cell and for providing a power removal circuit for facilitating removal of created power from the fuel cell. An example of the connector is an edge connector, such as a connector made by Foxconn Electronics, Inc. of California.

The method for making a single unit fuel cell includes placing a fuel manifold and an oxidant manifold in a sealable two-part housing for supporting the membrane electrode assembly and the flexible plenums. In an embodiment, the method can include compressing the flexible plenums to the membrane electrode assembly by using the end plates of the sealable two-part housing for providing communication between the plurality of nibs and the first metalized collector on the anode side and the plurality of nibs and the second metalized collector on the cathode side.

The sealable two-part housing further includes: a fuel entry port with a fuel channel in communication with the fuel manifold, a fuel exhaust port in communication with the flexible fuel plenum, an oxidant entry port with an oxidant channel in communication with the oxidant manifold, and an oxidant exhaust port in communication with the flexible oxidant plenum.

In an embodiment of the method, the sealable two-part housing is generally rectangular in shape, and the separate parts of the two-part housing are secured together with a threadable rod. In an embodiment, the sealable two-part housing is made of a non-conductive material to prevent static discharges.

The fuel manifold can be secured to the two-part housing to receive fuel from a fuel source through the fuel channel, and the oxidant manifold can be secured to the two-part housing to receive oxidant from an oxidant source through the oxidant channel.

The steps of the method continue by placing the intermediate structure between the fuel manifold and the oxidant manifold to connect the fuel manifold to one of the flexible fuel plenums for forming an anode and to connect the oxidant manifold to one of the flexible oxidant plenums for forming a cathode. For example, an anode is formed when fuel flows over the flexible fuel plenum to the first metalized collector, and a cathode is formed when oxidant flows over the flexible oxidant plenum to the second metalized collector.

Next, the method includes engaging the parts of the two-part housing together around the intermediate structure. Then, the method includes providing an oxidant to the flexible oxidant plenum and a fuel to the flexible fuel plenum forming an operational single unit fuel cell.

The method includes producing a current density of at least 350 milli-Amps (mA) per square centimeter at a nominal voltage of about 0.5 volts by the single unit fuel cell. The method includes making a fuel cell capable of an electrical output of at least 10.5 watts.

An example of the fuel cell size can be 3 inches in length by 4 inches in width by an ⅛ inch in thickness. Another example of the fuel cell can be 16 inches in length by 10 inches in width by an ⅛th inch in thickness having a voltage of 0.5 volts. A rectangular shape fuel cell is one example of a shape that can be used, or the fuel cell can be cylindrically shaped with the anode side on the inside of the fuel cell, the cathode side on the outside of the fuel cell, and can include hydrogen flowing down the center of the cylindrical shaped fuel cell.

With regard to the Figures, FIG. 1a depicts a cross sectional view of a membrane electrode assembly (8) for use in an embodiment of a method for making a fuel cell. The membrane electrode assembly (8) includes a proton exchange membrane (18) disposed between a first carbon base (10) and a second carbon base (12). A gasket (20) is disposed around the proton exchange membrane (18) for sealing the sides of the proton exchange membrane (18) without covering the anode side or the cathode side.

The first carbon base (10) has an anode side formed from between 0.1 milligrams/cm² and 0.3 milligrams/cm² of a first catalyst (14). The second carbon base (12) has a cathode side formed from between 0.3 milligrams/cm² and 0.6 milligrams/cm² of a second catalyst (16). Each catalyst can be made of a platinum catalyst, a ruthenium catalyst, and combinations thereof.

Figure 1B:
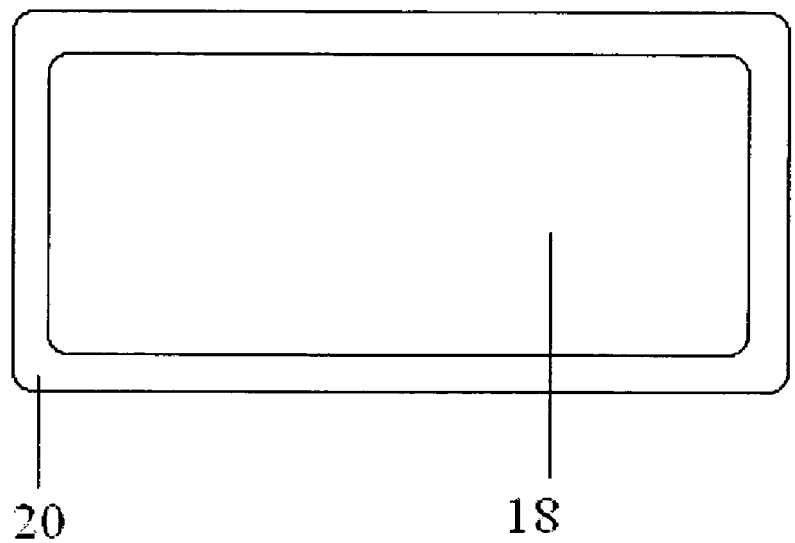
FIG. 1b depicts a top view of a gasket surrounding the anode side of a proton exchange membrane usable in an embodiment of a single unit fuel cell.

FIG. 1b depicts a top view of a gasket (20) surrounding the anode side of a proton exchange membrane (18) usable in an embodiment of a fuel cell.

Figure 2:
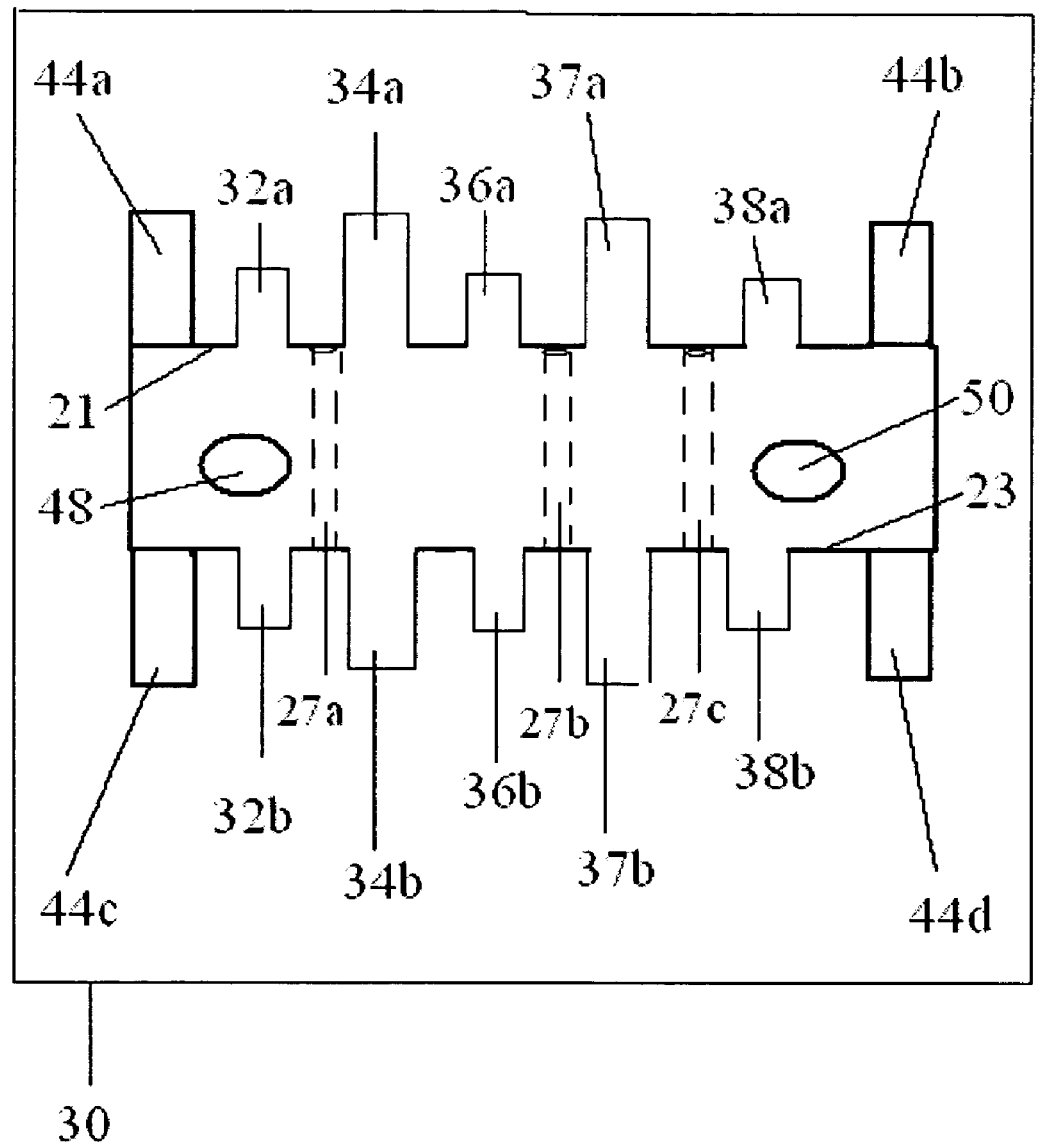
FIG. 2 depicts a cross sectional view of a flexible plenum for use in an embodiment of a method for making a single unit fuel cell.

FIG. 2 depicts a cross sectional view of a flexible fuel plenum (30) for use in an embodiment of a method for making a fuel cell. A flexible fuel plenum can be disposed on a side of the membrane electrode assembly of the fuel cell, and a flexible oxidant plenum can be disposed on an opposite side of the membrane electrode assembly for forming an intermediate structure of the fuel cell.

Figure 3:
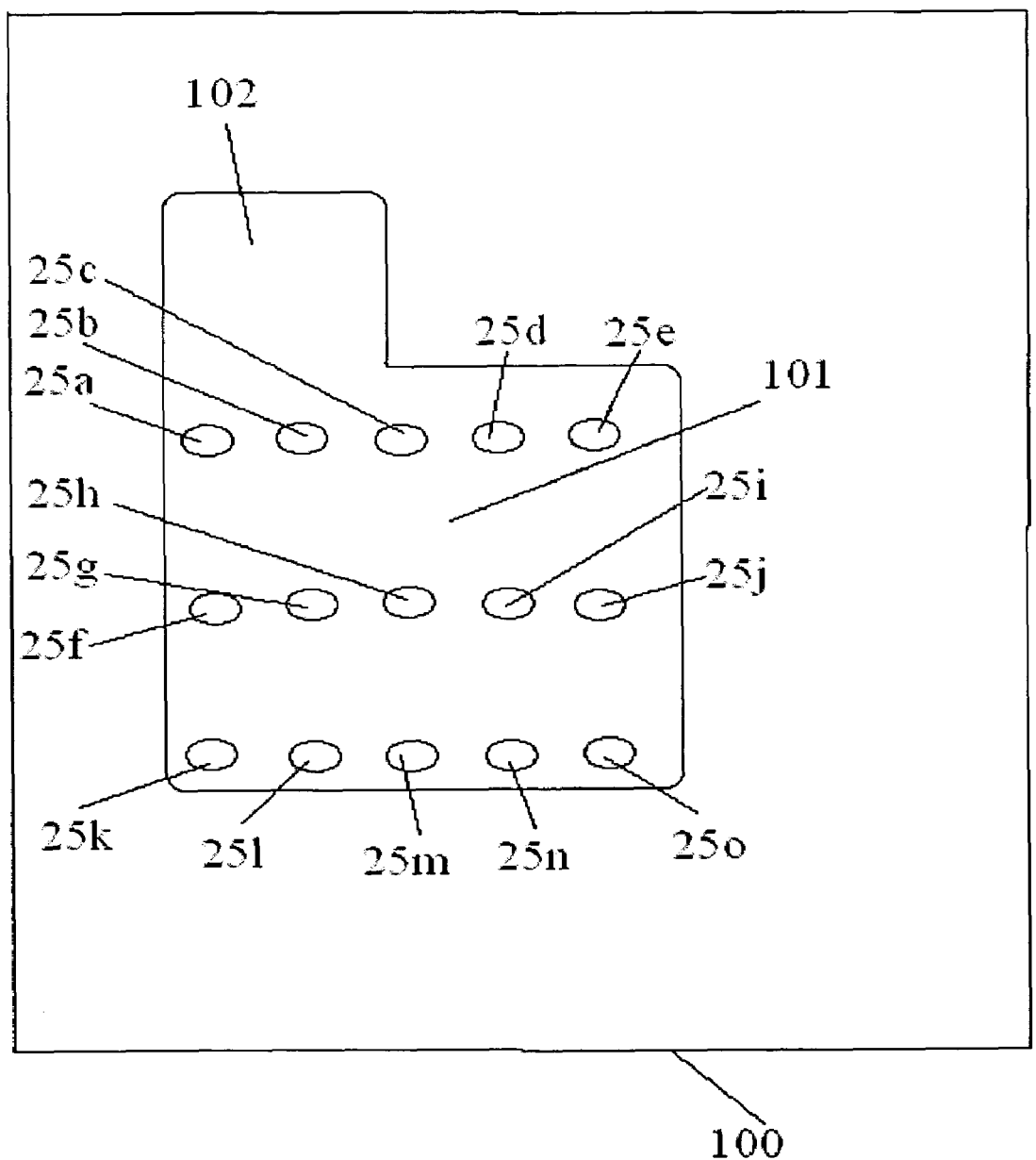
FIG. 3 depicts a top view of a metalized collector for use in an embodiment of a method for making a single unit fuel cell.
Figure 4:
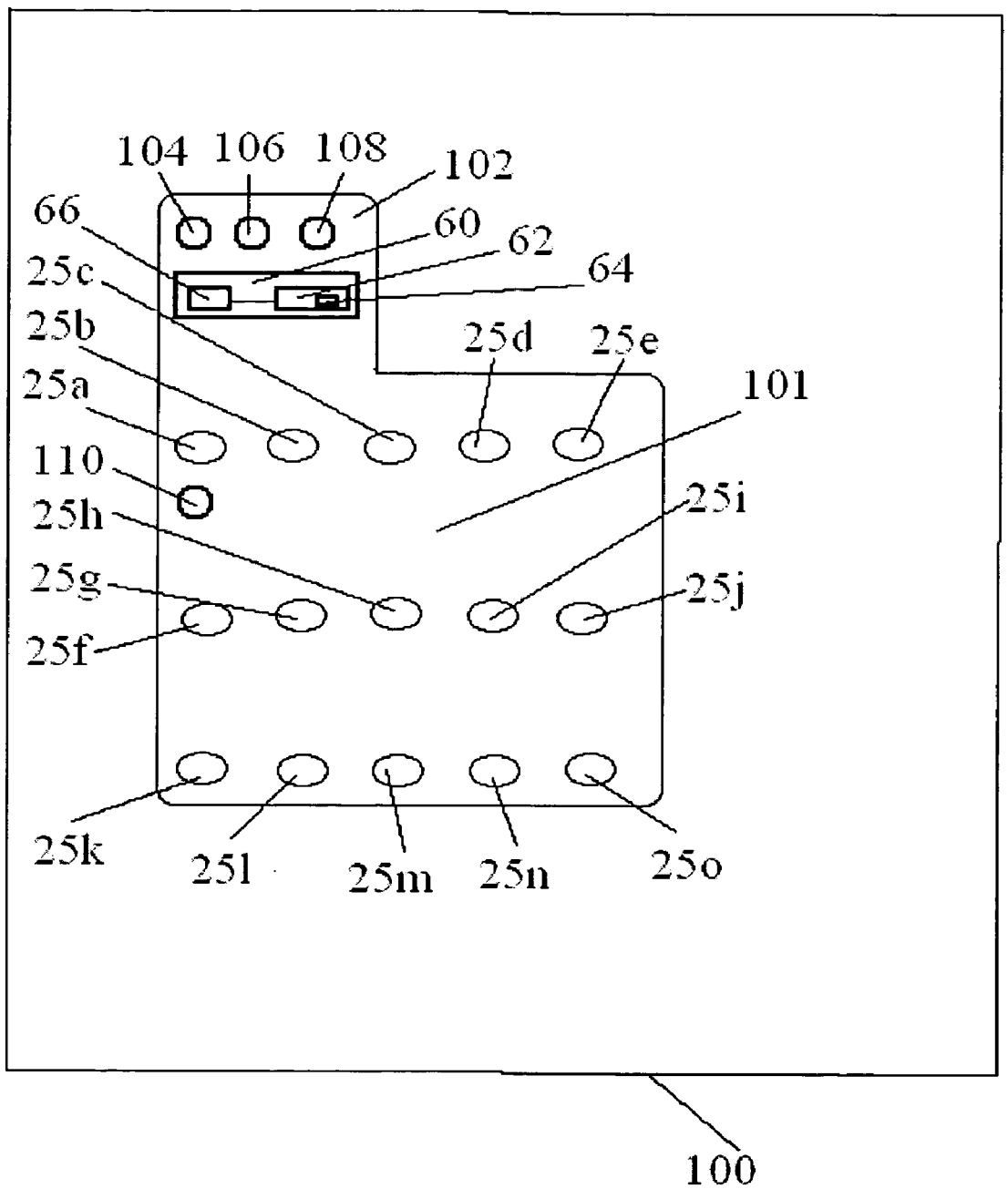
FIG. 4 depicts a top view of a metalized collector with sensors and a processor attached for use in an embodiment of a method for making a single unit fuel cell.

Each flexible plenum can include a top central portion (21) and a bottom central portion (23), and each central portion can include a plurality of holes for transmitting a gas to at least one metalized collector (100 as shown in FIG. 3 and FIG. 4). The top central portion (21) and the bottom central portion (23) can include a plurality of nibs (32a, 32b, 34a, 34b, 36a, 36b, 37a, 37b, 38a, and 38b) for increasing turbulence in gases flowing over the top central portion (21) and the bottom central portion (23) of each flexible plenum.

The flexible plenum includes a frame (44a, 44b, 44c, and 44d) that surrounds the top central portion (21) and the bottom central portion (23) of each flexible plenum (30) and provides a gas inlet passageway (48) and a gas exhaust passageway (50) for the flow of the gases. The embodiments include forming an anode by flowing fuel over the flexible fuel plenum to the first metalized collector, and forming a cathode by flowing oxidant over the flexible oxidant plenum to the second metalized collector. The flexible plenum includes a plurality of holes (27a, 27b, and 27c) that can be in communication with a plurality of paths in a metalized collector for the diffusion of gases.

FIG. 3 depicts a top view of a metalized collector (100) for use in an embodiment of a method for making a fuel cell. Each metalized collector is shaped with a body (101), a projection (102), and a plurality of paths (25a, 25b, 25c, 25d, 25e, 25f, 25g 25h, 25i, 25j, 25k, 25l, 25m, 25n, and 25o) formed through each body of each metalized collector for diffusion of gases.

FIG. 4 depicts a top view of a metalized collector (100) with sensors attached for use in an embodiment of a method for making a fuel cell. The metalized collector (100) can include a temperature sensor (104), a voltage sensor (106), and a current sensor (108) disposed on the projection (102) of the metalized collector (100). Further, the metalized collector (100) can include a pressure sensor (110) that can be disposed on the top central portion or bottom central portion of the body (101) of the metalized collector (100). The metalized collector (100) can include a processor (60) with a memory (62) having computer instructions (64) and a database storage (66), which are all disposed on the projection (102) of the metalized collector (100) and used for communications with the sensors regarding monitoring and regulating temperature, voltage, current, humidity, and flow with comparisons to preset limits stored in the database storage (66) and memory (62) of the processor (60).

Each metalized collector can be shaped with a body (101), a projection (102), and a plurality of paths (25a, 25b, 25c, 25d, 25e, 25f, 25g 25h, 25i, 25j, 25k, 25l, 25m, 25n, and 25o) formed through each body of each metalized collector for diffusion of gases. The plurality of paths can be in communication with the plurality of holes of a flexible plenum for permitting gas diffusion.

Figure 5:
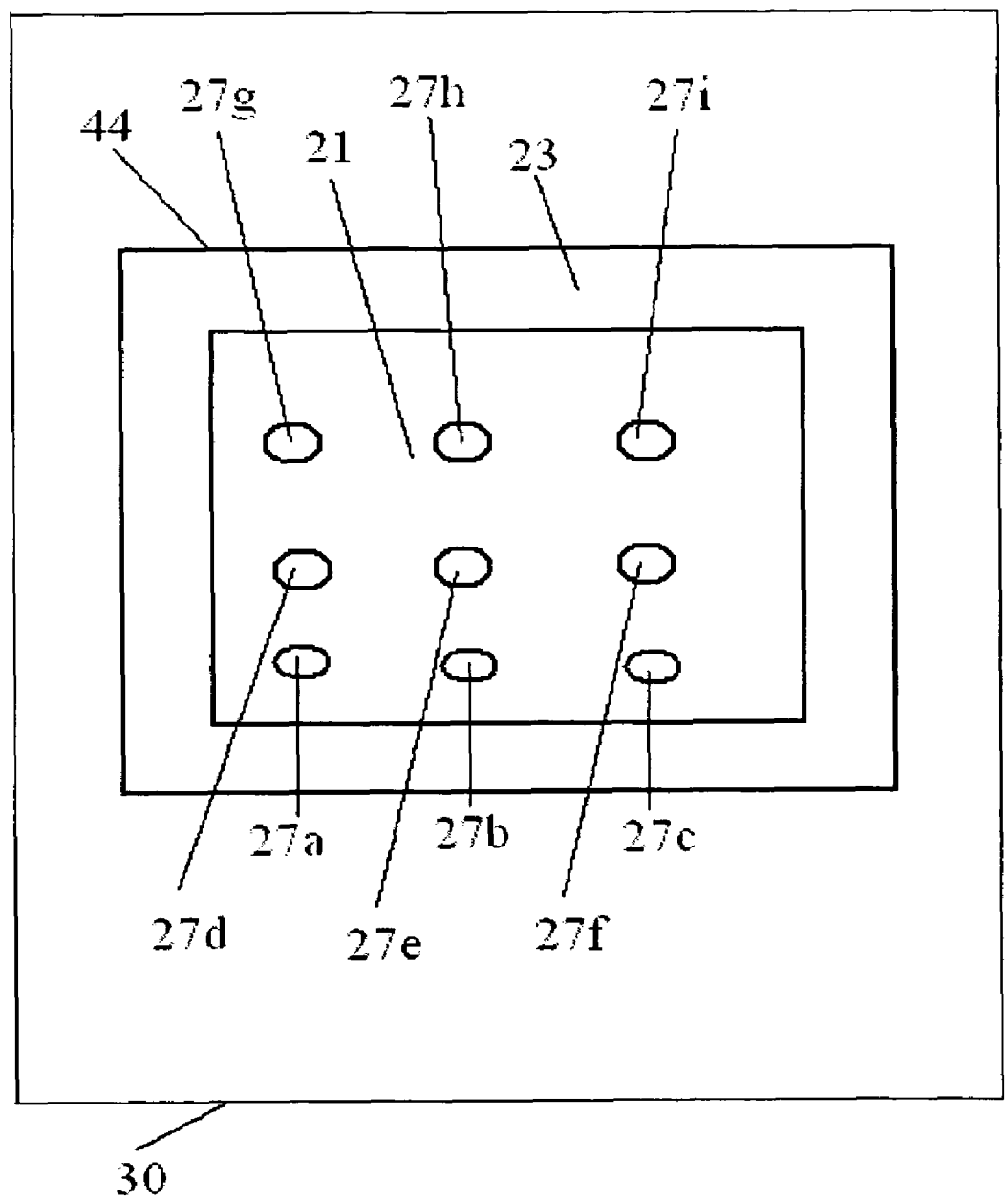
FIG. 5 depicts a top view of a flexible plenum for use in an embodiment of a method for making a single unit fuel cell.

FIG. 5 depicts a top view of a flexible plenum for use in an embodiment of a method for making a fuel cell. The flexible plenum (30) includes a frame (44), that surrounds the top central portion (21) and the bottom central portion (23) of each flexible plenum (30), and each central portion can include a plurality of holes (27a, 27b, 27c, 27d, 27e, 27f, 27g, 27h, and 27i) for transmitting a gas to at least one metalized collector (100, as shown in FIG. 4).

Figure 6:
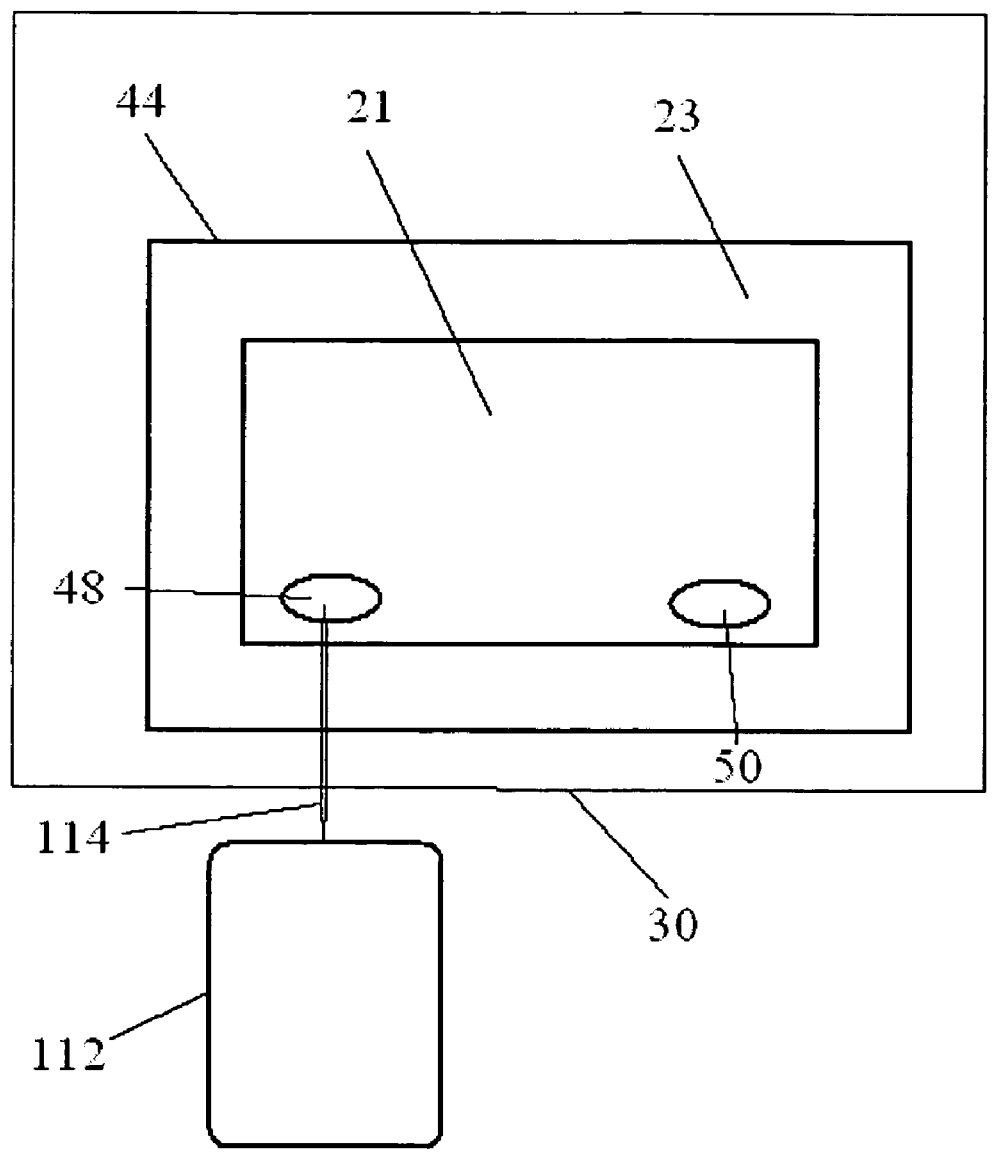
FIG. 6 depicts a top view of a flexible plenum with a needle usable in an embodiment of a method for making a single unit fuel cell.

FIG. 6 depicts a top view of a flexible plenum (30) with a needle (114) for use in an embodiment of a method for making a fuel cell. The flexible plenum (30) includes a frame (44), that surrounds the top central portion (21) and the bottom central portion (23) of the flexible plenum (30, and provides a gas inlet passageway (48), that can have a diameter of 0.030 inches to about 0.060 inches, and a gas exhaust passageway (50). The gas inlet passageway (48) can be connected to a hydrogen tank (112) for supplying fuel to the fuel cell, such as by using the needle (114). Alternatively, the needle (114) can be used for connecting the gas inlet passageway (48) to a reformer (not shown) for supplying fuel to the fuel cell. The reformer converts a hydrogen carrying fuel to hydrogen. Examples of hydrogen carrying fuels include ammonia, propane, methane, ethane, butane, and natural gas.

Figure 7:
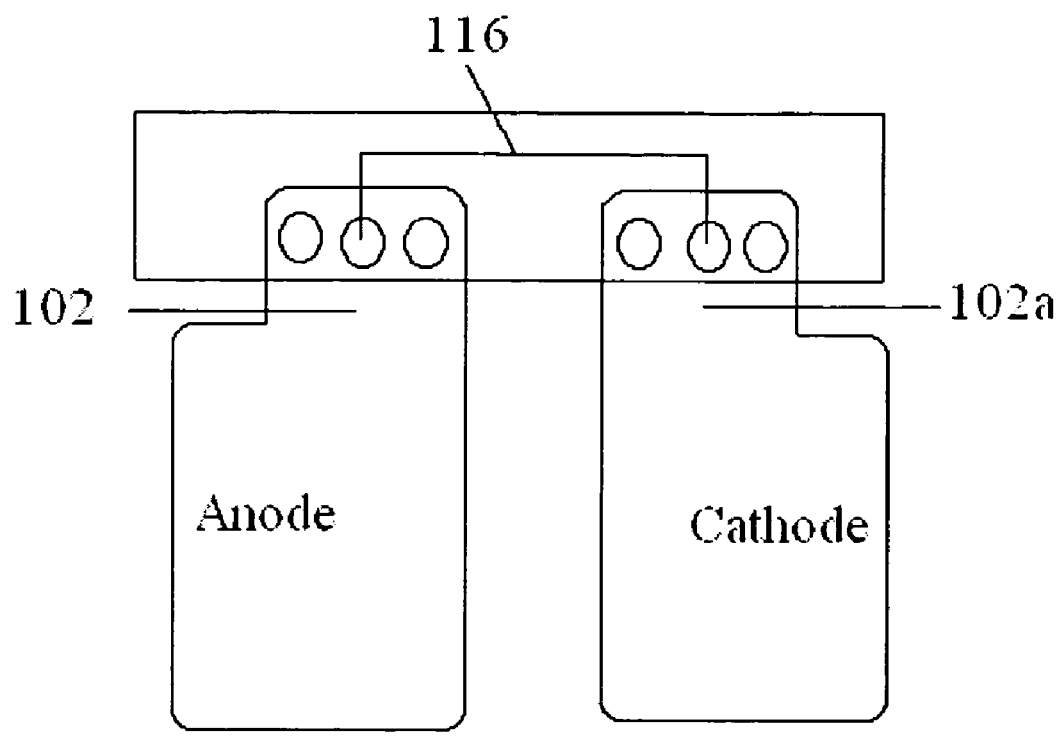
FIG. 7 depicts a top view of a connector for use in an embodiment of a method for making a single unit fuel cell.

FIG. 7 depicts a top view of a connector (116) for use in an embodiment of a method for making a fuel cell. The connector (116) engages the projections (102) of the first metalized collector on the anode side and the projections (102a) of the second metalized collector on the cathode side and forms an electrical circuit for operating the fuel cell and for providing a power removal circuit for facilitating removal of created power from the fuel cell.

Figure 8:
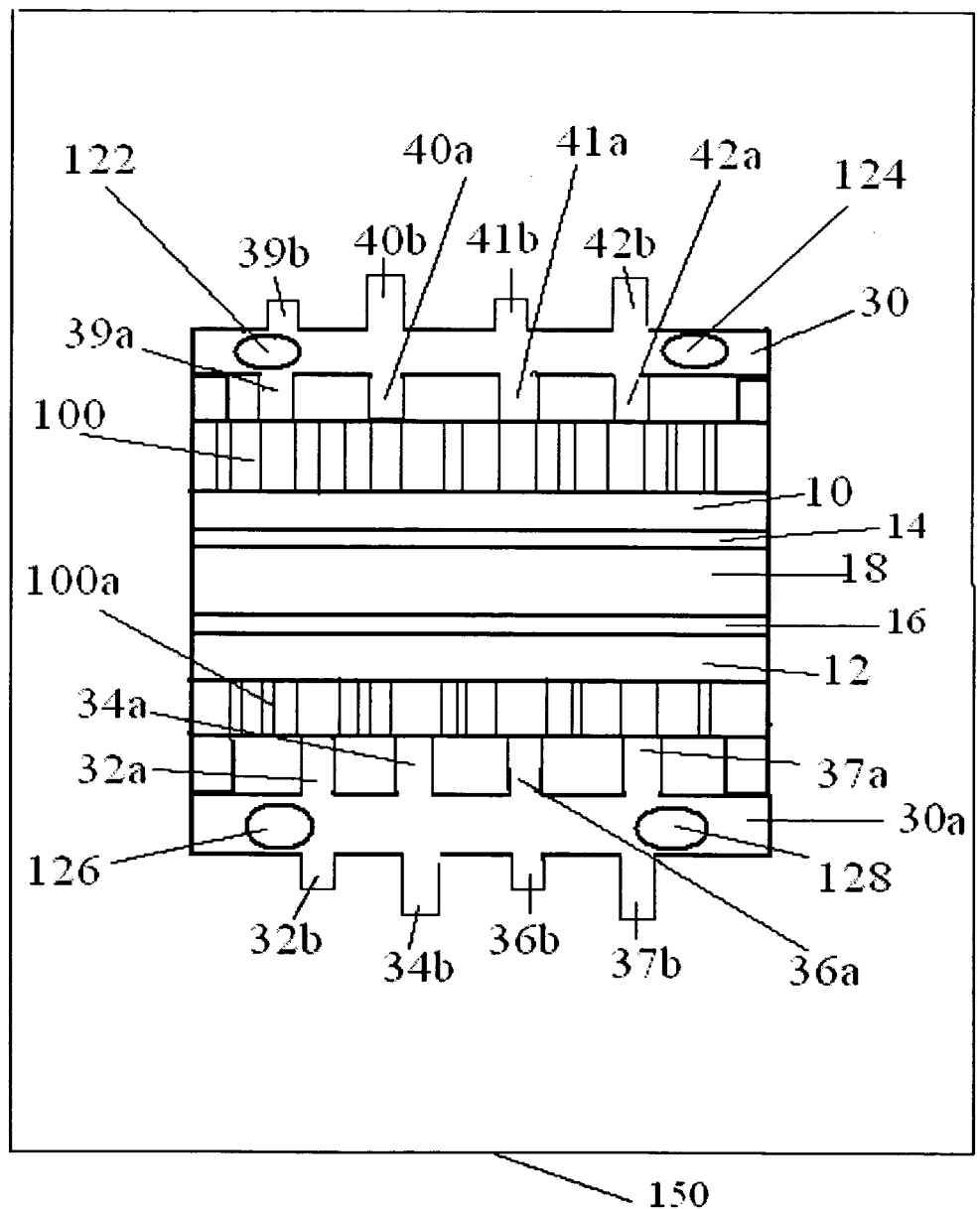
FIG. 8 depicts a cross sectional view of an embodiment of a single unit fuel cell.

FIG. 8 depicts a cross sectional view of an embodiment of a single unit fuel cell (150). The fuel cell includes a membrane electrode assembly with a proton exchange membrane (18) disposed between a first carbon base (10) and a second carbon base (12).

The embodiments of the method include forming an anode side from between 0.1 milligrams/cm$^2$ and 0.3 milligrams/cm$^2$ of a first catalyst (14) on a side adjacent to the proton exchange membrane (PEM), and forming a cathode side from between 0.3 milligrams/cm$^2$ and 0.6 milligrams/cm$^2$ of a second catalyst (16) on a side adjacent to the proton exchange membrane (PEM).

The method includes forming a first metalized collector (100) and disposing the first metalized collector (100) adjacent to the first carbon base (10) on the anode side of the proton exchange membrane. The method includes forming a second metalized collector (100a) and disposing the second metalized collector (100a) adjacent to the second carbon base (12) on the cathode side of the proton exchange membrane.

The single unit fuel cell (150) includes a flexible fuel plenum (30) on the anode side of the proton exchange membrane (18) with a plurality of nibs (39a, 40a, 41a, and 42a) on the top central portion and plurality of nibs (39b, 40b, 41b, and 42b) located on the bottom central portion for increasing turbulence in the flow of the gases. The single unit fuel cell (150) includes a flexible oxidant plenum (30a) on the cathode side of the proton exchange membrane (18) with a plurality of nibs (32a, 34a, 36a, and 37a) on the top central portion and plurality of nibs (32b, 34b, 36b, and 37b) located on the bottom central portion for increasing turbulence in the flow of the gases.

The embodiments of the fuel cell (150) include a sealable two-part housing for supporting an oxidant manifold positioned opposite a fuel manifold for supporting the membrane electrode assembly and the flexible plenums. The two-part housing supporting the flexible fuel plenum includes: a fuel entry port (122) with a fuel channel in communication with the fuel manifold and a fuel exhaust port (124) in communication with the flexible fuel plenum (30). The two-part housing supporting the flexible oxidant plenum (30a) includes: an oxidant entry port (126) in communication with an oxidant channel in communication with the oxidant manifold and an oxidant exhaust port (128) in communication with the flexible oxidant plenum (30a).

The embodiments of the fuel cell enable the forming of an anode when fuel flows over the flexible fuel plenum to the first metalized collector, and the forming of a cathode when oxidant flows over the flexible oxidant plenum to the second metalized collector.

Figure 9:
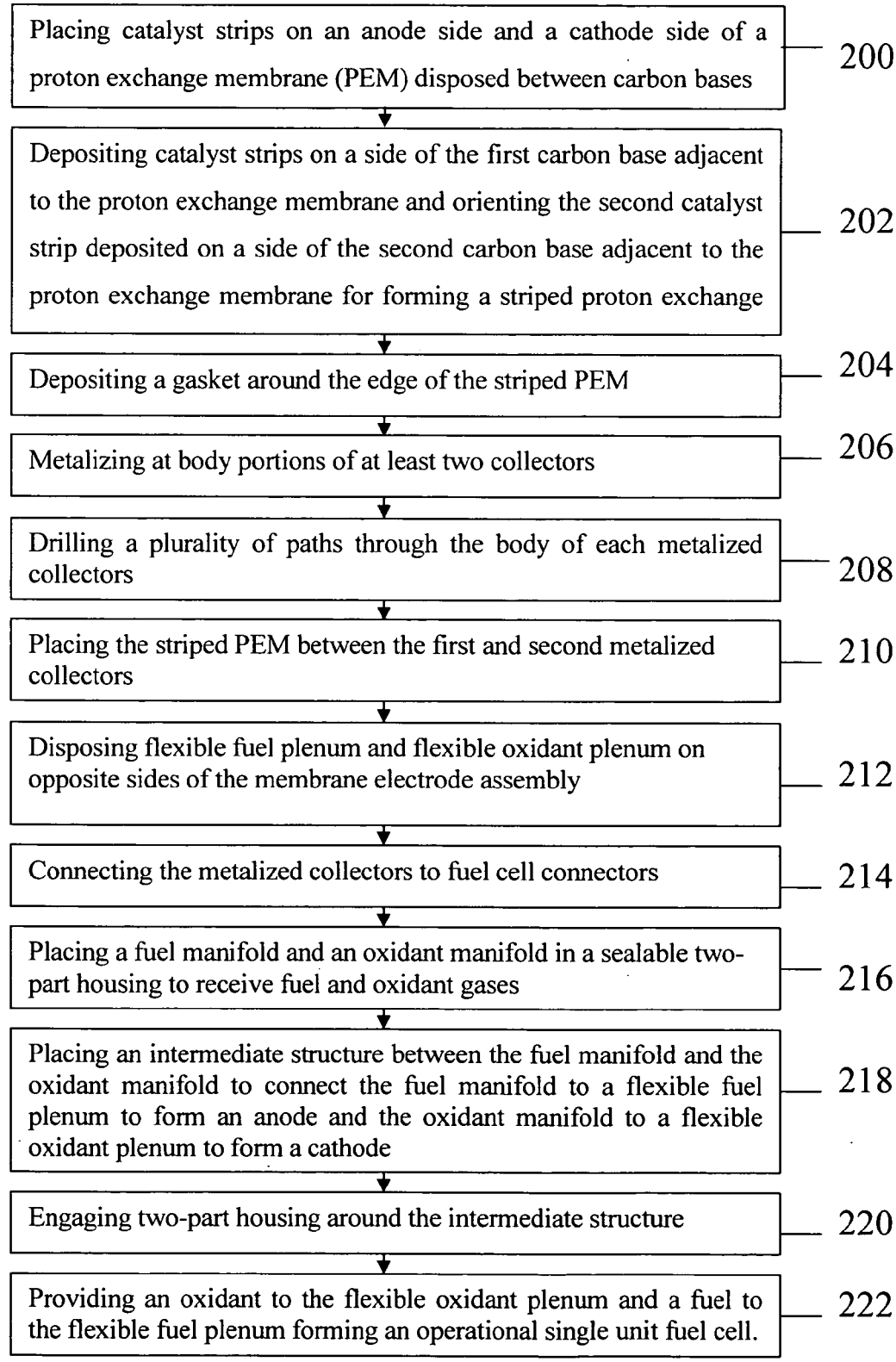
FIG. 9 depicts an embodiment of a method for making a single unit fuel cell.

FIG. 9 depicts an embodiment of the method for making a single unit fuel cell. In the embodiment, the steps of the method include placing between 0.1 milligrams/cm$^2$ and 0.3 milligrams/cm$^2$ of a first catalyst strip on an anode side of, and adjacent to, a proton exchange membrane and between 0.1 milligrams/cm$^2$ and 0.3 milligrams/cm$^2$ of a second catalyst strip on a cathode side of, and adjacent to, the proton exchange membrane, in which the proton exchange membrane is disposed between a first carbon base on the anode side and a second carbon base on the cathode side (200).

The first catalyst strips can be deposited in parallel strips on a side of the first carbon base adjacent to the proton exchange membrane and at an orientation, such as a 45 degree angle, to the second catalyst strips deposited on a side of the second carbon base adjacent to the proton exchange membrane for forming a striped proton exchange membrane (202).

The steps of the method continue by depositing a gasket around the edge of the striped proton exchange membrane for sealing the sides of the proton exchange membrane without covering the anode side or the cathode side (204).

Next, the method for making a single unit fuel cell includes metalizing body portions of at least two collectors to form the first metalized collector and the second metalized collector (206). Each metalized collector is shaped with a body portion and a projection portion. Then, a plurality of paths can be drilled through the body portions of the at least two metalized collectors (208).

Next, the striped proton exchange membrane (PEM) can be placed between the first metalized collector and the second metalized collector, such that the first metalized collector is deployed on the anode side of the proton exchange membrane and the second metalized collector is deployed on the cathode side of the proton exchange membrane forming a membrane electrode assembly (210).

The method continues by disposing a flexible fuel plenum on a side of the membrane electrode assembly and disposing a flexible oxidant plenum on an opposite side of the membrane electrode assembly for forming an intermediate structure (212).

Then, the method includes connecting the first metalized collector and the second metalized collector by using fuel cell connectors for transferring power outside the membrane electrode assembly (214). The connectors engage the projections of the first metalized collector and the projections of the second metalized collector forming an electrical circuit for operating the fuel cell and for providing a power removal circuit for facilitating removal of created power from the fuel cell.

The next steps of the method include placing a fuel manifold and an oxidant manifold in a sealable two-part housing (216). The two-part housing further includes: a fuel entry port with a fuel channel in communication with the fuel manifold for receiving fuel gases, a fuel exhaust port in communication with the flexible fuel plenum for releasing fuel exhaust, an oxidant entry port with an oxidant channel in communication with the oxidant manifold for receiving oxidant gases, and an oxidant exhaust port in communication with the flexible oxidant plenum for releasing oxidant exhaust. The fuel manifold is secured to the two-part housing to receive fuel from a fuel source through the fuel channel, and the oxidant manifold is secured to the two-part housing to receive oxidant from an oxidant source through the oxidant channel.

The steps of the method continue by placing the intermediate structure between the fuel manifold and the oxidant manifold to connect the fuel manifold to one of the flexible fuel plenums for forming an anode and to connect the oxidant manifold to one of the flexible oxidant plenums for forming a cathode (218).

Next, the method includes engaging the parts of the two-part housing together around the intermediate structure (220) by using a threadable rod and mounting holes. Then, the method includes providing an oxidant to the flexible oxidant plenum and a fuel to the flexible fuel plenum forming an operational single unit fuel cell (222).

While these embodiments have been described with emphasis on the embodiments, it should be understood that within the scope of the appended claims, the embodiments might be practiced other than as specifically described herein.

What is claimed is:

1. A method for making a fuel cell comprising:
  a. placing between 0.1 milligrams/cm$^2$ and 0.3 milligrams/cm$^2$ of a first catalyst strip on an anode side of a proton exchange membrane and between 0.1 milligrams/cm$^2$ and 0.3 milligrams/cm$^2$ of a second catalyst strip on a cathode side of the proton exchange membrane, wherein the proton exchange membrane is disposed between a first carbon base on the anode side and a second carbon base on the cathode side, wherein the first catalyst strip is deposited in parallel strips on a side of the first carbon base adjacent to the proton exchange membrane and oriented to the second catalyst strip deposited on a side of the second carbon base adjacent to the proton exchange membrane for forming a striped proton exchange membrane;
  b. depositing a gasket around an edge of the striped proton exchange membrane for sealing the sides of the proton exchange membrane without covering the anode side or the cathode side;
  c. metalizing at body portions of at least two collectors to form a first metalized collector and a second metalized collector, wherein each metalized collector is shaped with a body portion and a projection portion;
  d. drilling a plurality of paths through the body portions of the first metalized collector and the second metalized collector;
  e. placing the striped proton exchange membrane between the first metalized collector and the second metalized collector, wherein the first metalized collector is disposed adjacent to the first carbon base on the anode side of the proton exchange membrane and the second metalized collector is disposed adjacent to the second carbon base on the cathode side of the proton exchange membrane forming a membrane electrode assembly;
  f. disposing a flexible fuel plenum on a side of the membrane electrode assembly and disposing a flexible oxidant plenum on an opposite side of the membrane electrode assembly for forming an intermediate structure;
  g. connecting the first metalized collector and the second metalized collector to connectors for transferring power outside the membrane electrode assembly and for operating the fuel cell;
  h. placing a fuel manifold and an oxidant manifold in a sealable two-part housing, wherein the sealable two-part housing further comprises: a fuel entry port with a fuel channel in communication with the fuel manifold, a fuel exhaust port in communication with the flexible fuel plenum, an oxidant entry port with an oxidant channel in communication with the oxidant manifold, and an oxidant exhaust port in communication with the flexible oxidant plenum, wherein the fuel manifold is secured to the sealable two-part housing to receive fuel from a fuel source through the fuel channel, and wherein the oxidant manifold is secured to the sealable two-part housing to receive oxidant from an oxidant source through the oxidant channel;
  i. placing the intermediate structure between the fuel manifold and the oxidant manifold to connect the fuel manifold to one of the flexible fuel plenums for forming an anode and to connect the oxidant manifold to one of the flexible oxidant plenums for forming a cathode;
  j. engaging parts of the sealable two-part housing together around the intermediate structure; and
  k. providing an oxidant to the flexible oxidant plenum and a fuel to the flexible fuel plenum forming an operational single unit fuel cell.

2. The method of claim 1, further comprising the step of securing at least a member selected from the group consisting of: a temperature sensor, a voltage sensor, a current sensor, a humidity sensor, and combinations thereof, to the projections of at least one metalized collector and further securing a processor to the projections of the at least one metalized collector in connection with the member, wherein the processor comprises: a memory with computer instructions and a database storage, wherein the computer instructions instruct the processor to monitor and regulate a temperature, a voltage, a current, humidity, a gas flow, or combinations thereof, within preset limits, wherein the preset limits are stored in the database storage of the processor.

3. The method of claim 2, further comprising securing a pressure sensor to the body portion of the at least one metalized collector and connecting the pressure sensor to the processor.

4. The method of claim 2, further comprising a power supply in communication with the processor for providing power during start-up of the fuel cell.

5. The method of claim 1, wherein the plurality of paths in the first metalized collector and the second metalized collector are shaped comprising a member selected from the group consisting of: round, square, trapezoidal, and combinations thereof.

6. The method of claim 1, wherein the plurality of paths in the first metalized collector and the second metalized collector have a diameter between 0.1 inch and 0.5 inches.

7. The method of claim 1, wherein a layer of the first metalized collector and the second metalized collector comprises a member selected from the group consisting of: a gold, a gold alloy, and combinations thereof.

8. The method of claim 1, wherein the plurality of paths in each metalized collector is laser drilled or mechanically drilled.

9. The method of claim 1, wherein the sealable two-part housing is generally rectangular in shape, wherein the parts of the sealable two-part housing are secured together with a threadable rod.

10. The method of claim 1, wherein the sealable two-part housing is made of a non-conductive material to prevent static discharges.

11. The method of claim 1, wherein each catalyst is deposited by sputtering, printing, or silk screening.

12. The method of claim 1, wherein the thickness of the catalyst strips varies from up to about 0.01 inches in thickness.

13. The method of claim 1, wherein the gasket is secured around the proton exchange membrane with a silicon sealant.

14. The method of claim 1, wherein the proton exchange membrane is a member selected from the group consisting of: a proton permeable membrane, an electrically insulating membrane, a perfluorosulphonic acid based hydrophilic membrane, and combinations thereof.

15. The method of claim 1, further comprising engaging the sealable two-part housing around the intermediate structure for supporting each flexible plenum and the membrane electrode assembly, wherein the sealable two-part housing compresses each flexible plenum to the membrane electrode assembly for providing communication between the plurality of nibs and each metalized collector.

* * * * *